United States Patent [19]
Toth

[11] Patent Number: 5,520,445
[45] Date of Patent: May 28, 1996

[54] WHEEL TRIM AND LUG NUT RETENTION SYSTEM

[75] Inventor: John A. Toth, Orchard Lake, Mich.

[73] Assignee: Industrial & Automotive Fasteners, Inc., Ann Arbor, Mich.

[21] Appl. No.: 245,399

[22] Filed: May 18, 1994

[51] Int. Cl.⁶ ............................................. B60B 7/14
[52] U.S. Cl. ................................. 301/37.37; 301/108.4
[58] Field of Search .......................... 301/37.1, 37.37, 301/108.1, 108.4

[56]  References Cited

U.S. PATENT DOCUMENTS

| | | | |
|---|---|---|---|
| 3,356,421 | 12/1967 | Trevarrow, Jr. ............... | 301/37.37 X |
| 3,549,204 | 12/1970 | Spisak .......................... | 301/37.37 |
| 4,842,339 | 6/1989 | Roulinson ..................... | 301/37.37 |
| 4,998,780 | 3/1991 | Eshler et al. .................. | 301/37.37 |
| 5,181,767 | 1/1993 | Hudgins et al. ............... | 301/37.37 |

*Primary Examiner*—Russell D. Stormer
*Attorney, Agent, or Firm*—Harness, Dickey & Pierce

[57] ABSTRACT

A wheel cover retention system (10) for use with motor vehicle wheels includes a plurality of lug nuts (16) and a wheel cover (12). Each lug nut (16) has a decorative outer surface (42) with a flange (36) and a driving head which includes wrenching flats (42). The driving head sustains installation torque required to fix the wheel (14) to a vehicle. An intermediate body portion (40) of the lug nut (16) is smaller in diameter than the flange (36) is disposed between the flange and an end of the lug nut. The wheel cover has a plurality of apertures (28) accommodating passage therethrough of the body portion of the lug nuts (16).

15 Claims, 2 Drawing Sheets

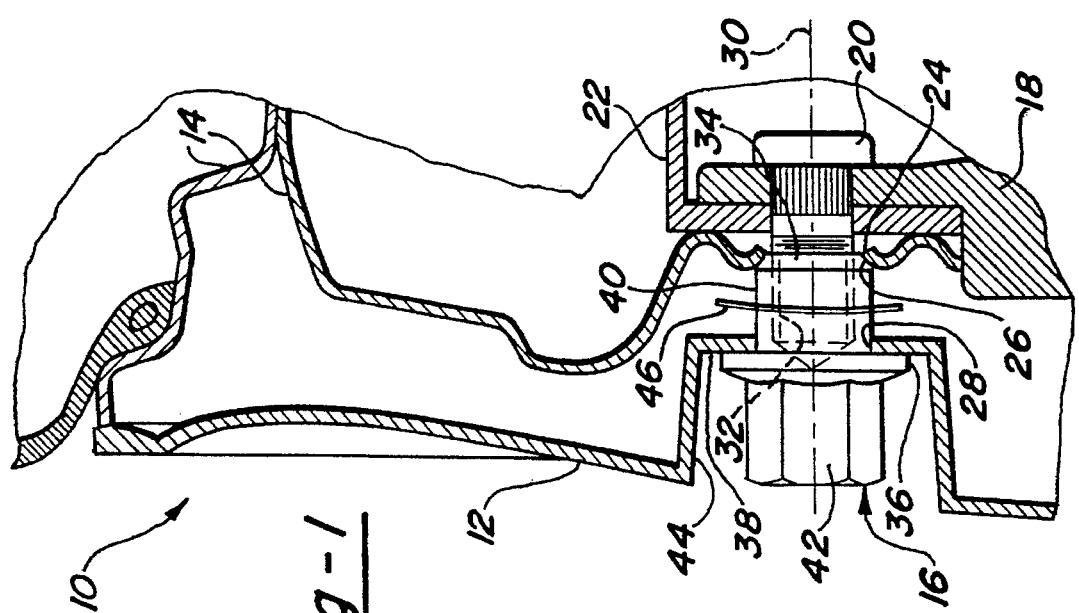
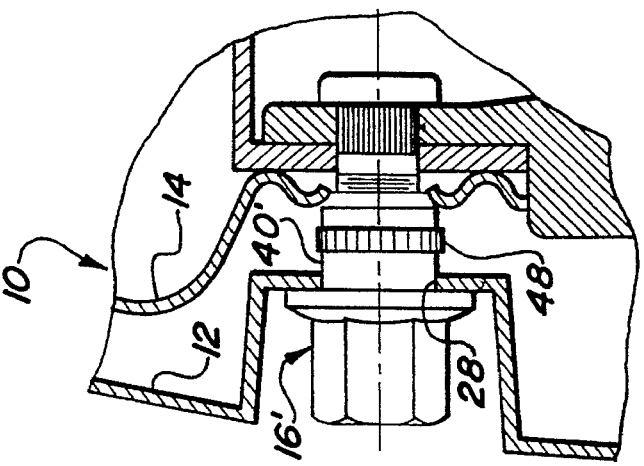
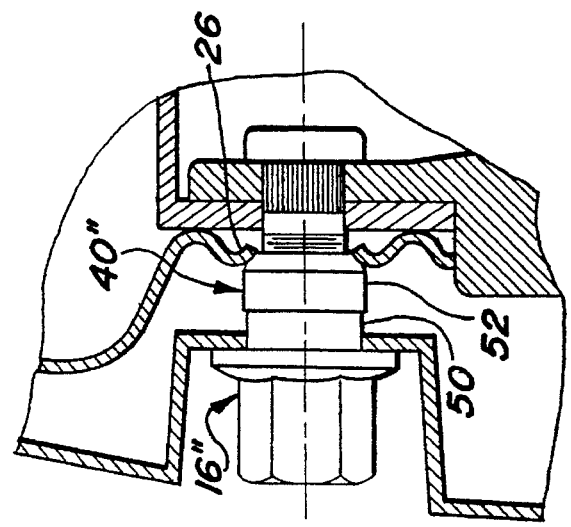

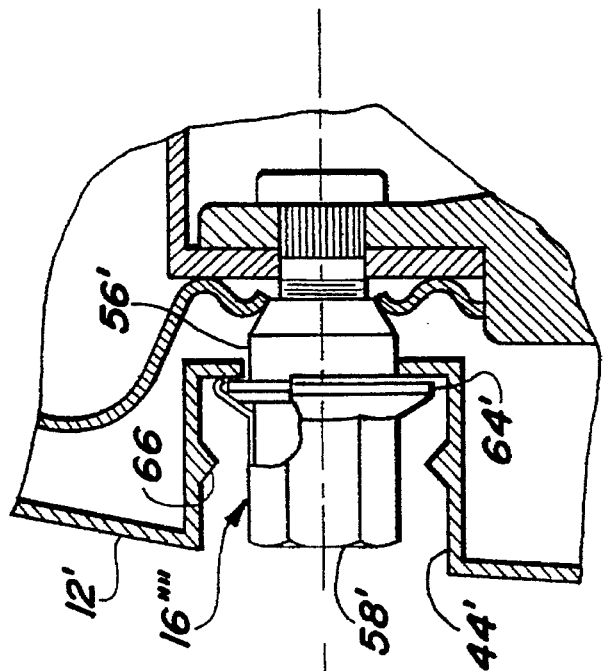
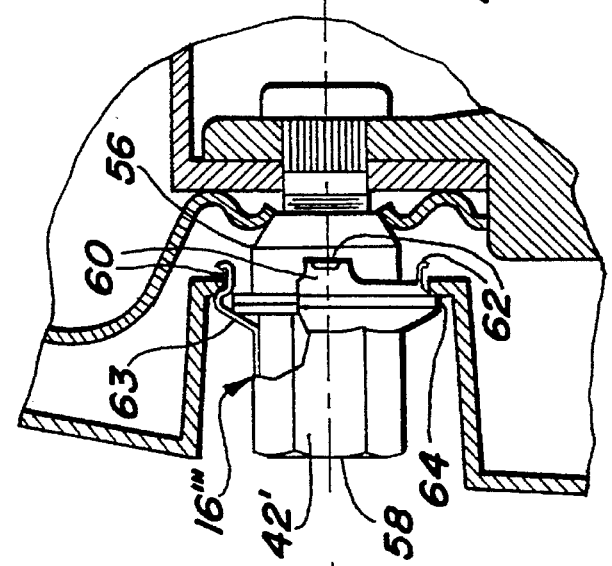
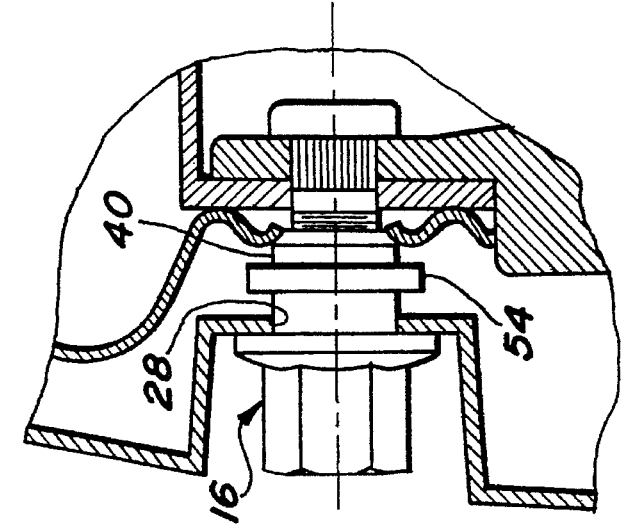

WHEEL TRIM AND LUG NUT RETENTION SYSTEM

TECHNICAL FIELD

This invention generally relates to lug nuts used to retain motor vehicle wheels on vehicle axle hubs, and deals more particularly with decorative type lug nuts which are retained on wheel covers for the wheels.

BACKGROUND OF THE INVENTION

Conventional wheel covers are typically retained on motor vehicle wheels by spring clips engaging an outer flange of the wheel or some other convenient location on the wheel. Severe wheel impacts have been known to dislodge wheel covers so retained from the wheels and of course, this form of retainment allows the wheel covers to be easily stolen.

Another method of retaining the wheel covers on vehicle wheels is exemplified by the wheel trim retention system shown in U.S. Pat. No. 4,998,780 issued Mar. 12, 1991 to Eshler, et al. The system shown in this patent employs decorative plastic caps which pass through apertures in the wheel cover and threadably engage an exterior thread on the lug nuts which retain the vehicle wheel on the vehicle. The plastic caps include a retainer to hold them on the wheel cover. Although this arrangement retains the wheel cover on the vehicle wheel, it is undesirable in that it increases the number of parts required to mount the wheel and wheel cover. An additional source of increased assembly complexity resides in the fact that the 5 lug nuts must be tightened to a fairly high torque level, and the plastic caps would be tightened to a relatively low torque level, thus making the use of a single torque control installation device unfeasible. Further, additional assembly labor and time is required since both the lug nuts and the plastic lug nut caps must be installed in separate operations. A further disadvantage of the Eshler et al system is that in some cases, the decorative plastic caps may loosen from the lug nuts because of jarring and vibration, thereby resulting in rattling of the caps on the wheel cover, or even loss of the wheel cover from the wheel.

It would therefore be desirable to provide a system for positively retaining wheel covers on motor vehicle wheels which require only one threading and torquing operation per lug nut. It would also be beneficial to reduce the number of parts handled by a vehicle assembler at the wheel and wheel cover mounting point on the assembly line. The present invention is directed to satisfying these and other objectives.

SUMMARY OF THE INVENTION

According to one aspect of the invention, a wheel cover retention system for use with motor vehicle wheels includes a wheel cover having a plurality of apertures therethrough, a plurality of lug nuts for securing a wheel and the wheel cover on the vehicle and means for retaining the lug nuts on the wheel cover. The lug nuts are preferably made of metal and include an outer, decorative end to which torque is applied in order to thread the lug nuts onto the lugs of the vehicle hub. The retaining means allows the lug nuts to be preassembled onto the wheel cover so that only a single torquing operation is required to mount both the wheel cover and the wheel onto the axle hub of the vehicle. In one embodiment, a retainer in the form of a ring which is either formed integral with a central body portion of the nut, or sleeved over the body portion, cooperates with a flange on the lug nut to capture a face of the wheel cover therebetween, however, there is sufficient radial clearance between the lug nut and the apertures in the wheel cover to permit turning of the lug nut during torquing of the lug nuts onto the lugs of the axle hub. Another embodiment of the retaining means employs an extension of a decorative metal cap secured on the outer end of the lug nut, wherein the cap extension extends through the wheel cover apertures and engages the backside of the wheel cover to limit axial displacement of the lug nuts away from the wheel. A still further embodiment of the retaining means includes lateral, blocking projections formed integral with the wheel cover which engage a flange or other feature on the lug nut to likewise limit outward axial displacement of the lug nuts on the wheel cover, prior to their being torqued onto the lugs.

According to another aspect of the invention, a method of mounting a wheel and a wheel cover on a motor vehicle comprises passing a plurality of decorative lug nuts into corresponding apertures in the wheel cover, retaining the lug nuts on the wheel cover in order to form a subassembly, positioning this subassembly in a mounting position over the wheel such that the lug nuts are axially aligned with lugs on the vehicle hub, and then torquing the lug nuts onto the lugs, thereby simultaneously mounting the wheel cover and the wheel on the vehicle hub.

BRIEF DESCRIPTION OF THE DRAWINGS

FIG. 1 is a partial sectional view of a vehicle wheel with a wheel cover mounted thereon by a first embodiment of this invention.

FIG. 2 is a partial sectional view of a vehicle wheel with a wheel cover retained by a second embodiment of the present invention.

FIG. 3 is a partial sectional view of a vehicle wheel with a wheel cover retained by a third embodiment of the present invention.

FIG. 4 is a partial sectional view of a vehicle wheel with a vehicle wheel cover retained by a fourth embodiment of the present invention.

FIG. 5 is a partial sectional view of a vehicle wheel with a vehicle wheel cover retained by a fifth embodiment of the present invention.

FIG. 6 is a partial sectional view of a vehicle wheel with a vehicle wheel cover retained by a sixth embodiment of the present invention.

DESCRIPTION OF THE PREFERRED EMBODIMENT

As shown in FIGS. 1–6, a wheel cover retention system 10 holds a wheel cover 12 against a vehicle wheel 14 by means of a plurality of lug nuts 16 which also hold the wheel 14 to an axle flange 18 of a vehicle (not shown).

The axle flange 18 has secured thereto a plurality of circumferentially spaced lugs 20 which extend axially outward and are threaded at their outer ends to threadably receive later discussed lug nuts 16 thereon. A brake rotor 22 is shown on an outboard side of the flange 18. The wheel 14 has a plurality of circumferentially spaced apertures 24 accommodating the passage of the lugs 20 therethrough. Each of the wheel apertures 24 has a tapered seat 26. The wheel cover 12 is disposed over the vehicle wheel 14 and includes a plurality of apertures 28 aligned with the lugs 20. The wheel cover 12 can be large enough to either cover the entire wheel 14 or only a central portion, or hub, of the wheel 14.

The lug nuts 16 extend through the wheel cover apertures 28 and are each provided with a central threaded aperture 32 on one end thereof which is coaxially aligned with the central axis 30 of the nut 16. The threaded aperture 32 threadably receives the exterior or male threads on the lugs 20. A tapered seat portion 34 on one end of the lug nuts 16 engages the tapered seat 26 of the wheel apertures 24. A circumferentially extending radial flange 36 of the lug nuts 16 overlaps and engages an outer seating surface 38 on the wheel cover 12, which is shown as being recessed in a pocket 44 in the embodiment of the wheel cover 12 illustrated in the drawings.

Extending between the flange 36 and the tapered seat portion 34 of the lug nut 16, is a cylindrically shaped central body portion 40. Axially extending from the flange 36 on the outer end of the nut 16 are a plurality of wrench flats defining a hex head 42 which permits application of wrenching torque to the nut 16. The hex head 42 is substantially disposed within the pocket 44. Alternatives to the hex head 42 include conventional wheel locks (not shown) which could be engaged for rotation by a key applied thereto which includes a hex head.

The lug nuts 16 may be of a one piece design, as shown in FIGS. 1–4, which is provided with a decorative finish such as chrome plating or anodizing. Alternatively, the lug nuts 16 may be of a two piece construction, as shown in FIGS. 5 and 6, wherein an outer decorative cap of stainless steel or the like, is disposed over the outer free end of the nut body and is secured thereon by means of welding and/or crimping. Examples of suitable two piece "capped" lug nut constructions are disclosed in U.S. Pat. Nos. 4,123,961; 4,018,133; 4,775,272; and 4,850,776, the entire disclosures of which are incorporated by reference herein.

Retaining means in the form of a sheet metal push nut 46 is disposed over and frictionally engages the body portion 40 of the lug nut 16. The push nut 46, in combination with the flange 36, serve to retain the lug nut 16 on the wheel cover 12 even when the lug nut 16 is not engaged with the lug 20. Not only does this prevent the accidental loss of lug nuts 16 on the roads but more importantly, the lug nuts 16 can be preassembled onto the wheel covers 12, and then mounted onto the wheel as a complete subassembly, thereby saving substantial labor time on the assembly line and reducing material handling problems. In the case of the arrangement shown in FIG. 1, as well as the alternate embodiments described below, the retaining means is axially spaced a sufficient distance from the flange 36 such that the lug nut 16 is freely displaceable a limited distance along its central axis, thereby allowing it to turn freely and be axially displaced when it is torqued onto the lug 20.

The wheel trim and lug nut retention system of the present invention is employed in the following manner. First, the lug nuts 16 are mounted on the wheel cover 12 to form a subassembly. This is performed by placing the lug nuts 16 in the pockets 44 of the wheel cover 12 such that the body portions 40 extend through the apertures 28. Sheet metal push nuts 46 are then sleeved over the body portions 40, thereby effectively capturing the lug nuts 16 within the wheel cover apertures 28. The wheel cover 12 is then positioned over and aligned with the vehicle wheel and axle flange 18 such that the lug nuts 16 are aligned with the lugs 20. The threaded apertures 32 engage the threads of the lugs 20 upon turning of the lug nuts 16. Continued turning of the lug nuts 16 brings the tapered seat portion 34 of the lug nuts 16 into contact with the tapered seat 26 of the wheel apertures. The lug nuts 16 are torqued through their hex heads 42 to fix the wheel 14 to the axle flange 18. The wheel 14 to wheel cover 12 relationship is such that when the tapered seat portion 34 of the lug nut 16 is contacting the tapered seat 26 of the wheel apertures, the wheel cover 12 is elastically deflected toward the wheel 14 by the nut flange 36 pressing against the seating surface 38 within the wheel cover pockets 44. The embodiment shown in FIG. 1 depicts the wheel cover 12 contacting the wheel 14 at an outer diameter. This ensures that the wheel cover 12 will be clamped tightly against the wheel 14 by the lug nuts 16.

The embodiments of the wheel trim and lug nut retention system 10 shown in FIGS. 2–6 function similar to that shown in FIG. 1 except for variations in the means for retaining the lug nuts 16 on the wheel cover 12.

As shown in FIG. 2, an alternate embodiment of the retaining means is defined by a circumferentially extending khurled section 48 around the medial area of the body portion 40' which includes ridges of slightly greater diameter than the wheel cover apertures 28. The hurled section 48 has an outer diameter sufficient to allow the nut 16' to be press fit through the wheel cover apertures 28 but prevents the nuts 16 from being easily retracted back through the apertures 28.

The embodiment shown in FIG. 3 includes a body portion 40" having a clearance fit section 50 proximate to the flange 36 and an enlarged diameter, press fit section 52 adjacent the tapered end 26. The lug nuts 16" have the press fit sections 52 forced or "snapped" through the wheel cover apertures 28 so that the clearance fit section 50 is disposed in the wheel cover apertures 28. The lug nuts 16" then move axially freely within the wheel cover apertures 28 between the flange 36 and the press fit section 52 so that the nuts can be axially displaced the necessary distance to be threaded onto the lugs 20 but at the same time engage and impose an inwardly directed force on the wheel cover 12.

The lug nut shown in FIG. 4 is identical with the lug nut 16 of FIG. 1, except that instead of a sheet metal push nut 46 being disposed over the body portion 40, a flexible, resilient natural or synthetic retaining member which could comprise, for example, a neoprene or plastic washer or O-ring 54 is sleeved over the body portion 40. The outside diameter of the washer 54 compared to the diameter of the aperture 28 is such that there is sufficient interference between the washer 54 and the shank portion 40 to prevent the lug nuts 16 from becoming dislodged or separated from the wheel cover 12.

The lug nut 16''' in the embodiment shown in FIG. 5 is a two-piece assembly comprising a unitary body 56 and a surrounding sheet metal cap 58 on the outer, free end of the nut body 56. The cap 58 is secured to the nut body 56 by welding techniques that are well known in the art. Such welding may be performed, for example, on those areas at the outer end of the cap which are in face-to-face contact with opposing surfaces on the outer end of the nut body 56. An intermittent or continuous, laterally extending shoulder (not shown) may be formed near either the free outer end of or at the base of the cap 58 and nut body 56 to provide a weldable contact interface. The sheet metal cap 58 extends down over the flats of the hex head 42 and includes a circumferential skirt 63 which overlies the nut body flange 64 and extends through the aperture 28 in the wheel cover 12. The skirt 63 has substantially U-shaped axially extending channel 60 with an outwardly turned edge 62. The channel 60 may be circumferentially continuous or may be defined by a plurality of circumferentially spaced intermittent channel portions. The U-shaped channel 60 includes a pair of opposed legs which capture the circumferential edge of the wheel cover 12 that defines the apertures 28. When the lug nuts 16‴ are snapped into the wheel cover apertures 28, the channel edge 62 deflects radially inward, and springs back once the edge 62 has passed the wheel cover apertures 28. Once the edge 62 has sprung back, the lug nut 16‴ cannot be easily withdrawn from the wheel cover apertures 28.

FIG. 6 illustrates a further embodiment of the wheel cover retention system 10. A lug nut 16⁗ resembles the lug nut 16‴ of FIG. 5 in that it has a unitary nut body 56' and a sheet metal cap 58' secured to the outer end thereof. The lug nut 16⁗, however, does not have an axially extending channel. Rather, the retaining means is defined by a plurality of dimples or a single, continuous ridge 66 extending radially (laterally) inward, in axially overlapping relationship to the flange portion 64' of the cap 58'. The dimples or ridge 66, which have some degree of resilient flexibility, act as a stop to restrict the movement of a flange portion 64' of the cap 58' therepast. The nut 16⁗ is installed on the wheel cover 12' by applying an axial force against the head of the nut to force it to snap past the flexible dimples or ridge 66.

Obviously, many modifications and variations of the present invention are possible in light of the above teaching. It is therefore to be understood, that within the scope of the appended claims, the invention may be practiced otherwise and as specifically described.

I claim:

1. A wheel cover retention system for use with motor vehicle wheels comprising:

a wheel cover having a front side, a back side and including edge portions defining a plurality of apertures therethrough;

a plurality of lug nuts for securing a wheel and the wheel cover on the vehicle, each of the lug nuts including a metal nut body having an outer end adapted to have a driving torque applied thereto, an intermediate body portion passing through a corresponding one of the apertures, and an inner end adapted to engage the wheel, said outer end including a radial flange adjacent said intermediate body portion, said flange being of a size preventing passage of said outer end through said apertures; and retaining means for retaining the lug nuts on the wheel cover, said retaining means includes a retainer secured to said flange, the retainer extending through the corresponding aperture and engaging the back side of the wheel cover to retain the lug nut with the wheel cover.

2. The wheel cover retention system of claim 1 wherein the retainer includes a U-shaped section and said edge portion of the aperture is captured within the U-shaped section.

3. The wheel cover retention system of claim 2 wherein the U-shaped section includes a leg engaging the back side of the wheel cover.

4. The wheel cover retention system of claim 1 wherein said retaining means is a portion of a decorative cap said outer end of said nut.

5. A wheel cover and lug nut subassembly adapted to be mounted on a wheel of a motor vehicle, comprising:

a wheel cover for covering at least a portion of the wheel and including a plurality of apertures therein;

a plurality of lug nuts for securing the wheel cover and the wheel on the vehicle, each of the lug nuts including (1) a first end adapted to have a driving torque applied thereto, (2) an intermediate body portion extending through a corresponding one of the apertures, (3) a flange between the first end and the body portion for engaging the wheel cover, and (4) a second end including threaded portions adapted to be threadably secured to the wheel; and means for retaining the lug nuts on the wheel cover, including a retainer disposed on the outer surface of the body portion.

6. The subassembly of claim 5, wherein the retainer includes a band of increased diameter integrally formed on the body portion, the diameter of the band being greater than the diameter of the corresponding aperture.

7. The subassembly of claim 5, wherein the retainer includes a hurled section on the body portion, the hurled section creating interference with portions of the wheel cover surrounding the corresponding aperture to prevent removal of the lug nut from the aperture.

8. The subassembly of claim 5, wherein the retainer includes a band of flexible material sleeved over the body portion.

9. The subassembly of claim 5, wherein the retaining means is formed integral with the body portion of the lug nut.

10. The subassembly of claim 5, wherein the retaining means is disposed intermediate the second end of the lug nut and the flange.

11. The subassembly of claim 5, wherein the first end of the lug nut is defined by a metal cap fixedly secured to the body portion.

12. The subassembly of claim 11, wherein the lug nut includes a nut body and a metal cap, the metal cap covering the first end and being welded to the nut body.

13. A wheel cover retention system for use with motor vehicle wheels comprising:

a wheel cover including a plurality of apertures therethrough;

a plurality of lug nuts for securing a wheel and said wheel cover on the vehicle, each of said lug nuts including a metal nut body having an outer end adapted to have a driving torque applied thereto, an intermediate body portion passing through a corresponding one of said apertures, and an inner end adapted to engage the wheel, said outer end including a radial flange adjacent said intermediate body portion, said flange being of a size preventing passage of said outer end through said apertures; and retaining means for retaining said lug nuts on the wheel cover, said retaining means including at least one projection on said wheel cover disposed an axial distance from said apertures and trapping said flange between said apertures and said projection to retain said lug nut with said wheel cover.

14. The wheel cover retention system of claim 13 wherein said projection is formed on the front of said wheel cover and extends laterally into blocking relationship with said flange and acts as a stop to limit axial displacement of said lug nut away from the wheel.

15. The wheel cover retention system of claim 13 wherein:

said wheel cover includes a plurality of pockets therein and said lugs nuts are respectively disposed within said pockets, and said projections are disposed within said pockets.

\* \* \* \* \*

UNITED STATES PATENT AND TRADEMARK OFFICE
CERTIFICATE OF CORRECTION

PATENT NO. : 5,520,445
DATED : May 28, 1996
INVENTOR(S) : John A. Toth

It is certified that error appears in the above-indentified patent and that said Letters Patent is hereby corrected as shown below:

In Column 4, line 19, delete "hurled" and insert --knurled--.

In Column 5, line 56, Claim 4, after "cap" insert --engaging--.

In Column 6, line 14, Claim 7, after "the" delete "hurled" and insert --knurled--.

Signed and Sealed this

Fifth Day of November, 1996

Attest:

BRUCE LEHMAN

Attesting Officer

Commissioner of Patents and Trademarks